United States Patent
DiGiacinto et al.

[11] 3,959,779
[45] May 25, 1976

[54] LEFT ZERO FILL CIRCUIT

[75] Inventors: Ross DiGiacinto, Chicago; Clarence Turek, Glenview, both of Ill.

[73] Assignee: Specialized Electronics Corporation, Chicago, Ill.

[22] Filed: Sept. 30, 1974

[21] Appl. No.: 510,142

[52] U.S. Cl.................................. 340/172.5; 234/24
[51] Int. Cl.² ........................................... G06F 3/00
[58] Field of Search................... 340/172.5; 234/24

[56] References Cited
UNITED STATES PATENTS

| | | | |
|---|---|---|---|
| 3,338,512 | 8/1967 | Fitzpatrick et al.................. | 234/24 |
| 3,665,403 | 5/1972 | Igel et al......................... | 340/172.5 |

*Primary Examiner*—Gareth D. Shaw
*Assistant Examiner*—C. T. Bartz
*Attorney, Agent, or Firm*—Wolfe, Hubbard, Leydig, Voit & Osann, Ltd.

[57] ABSTRACT

A left zero fill circuit particularly suited for incorporation into non-buffered keypunch machines for providing a left zero fill capability thereto. The circuit provides a combination of registers and memory storage devices operable in an input mode to accept keypunch data, and in an output mode to punch the data onto a card in the proper locations within the field. The circuit further includes isolation means interposed in the interconnections between the keypunch machine and the left zero elements to isolate the power supplies and to allow the keypunch machine to be serviced in the normal manner, simply by switching the left zero fill circuit off.

16 Claims, 1 Drawing Figure

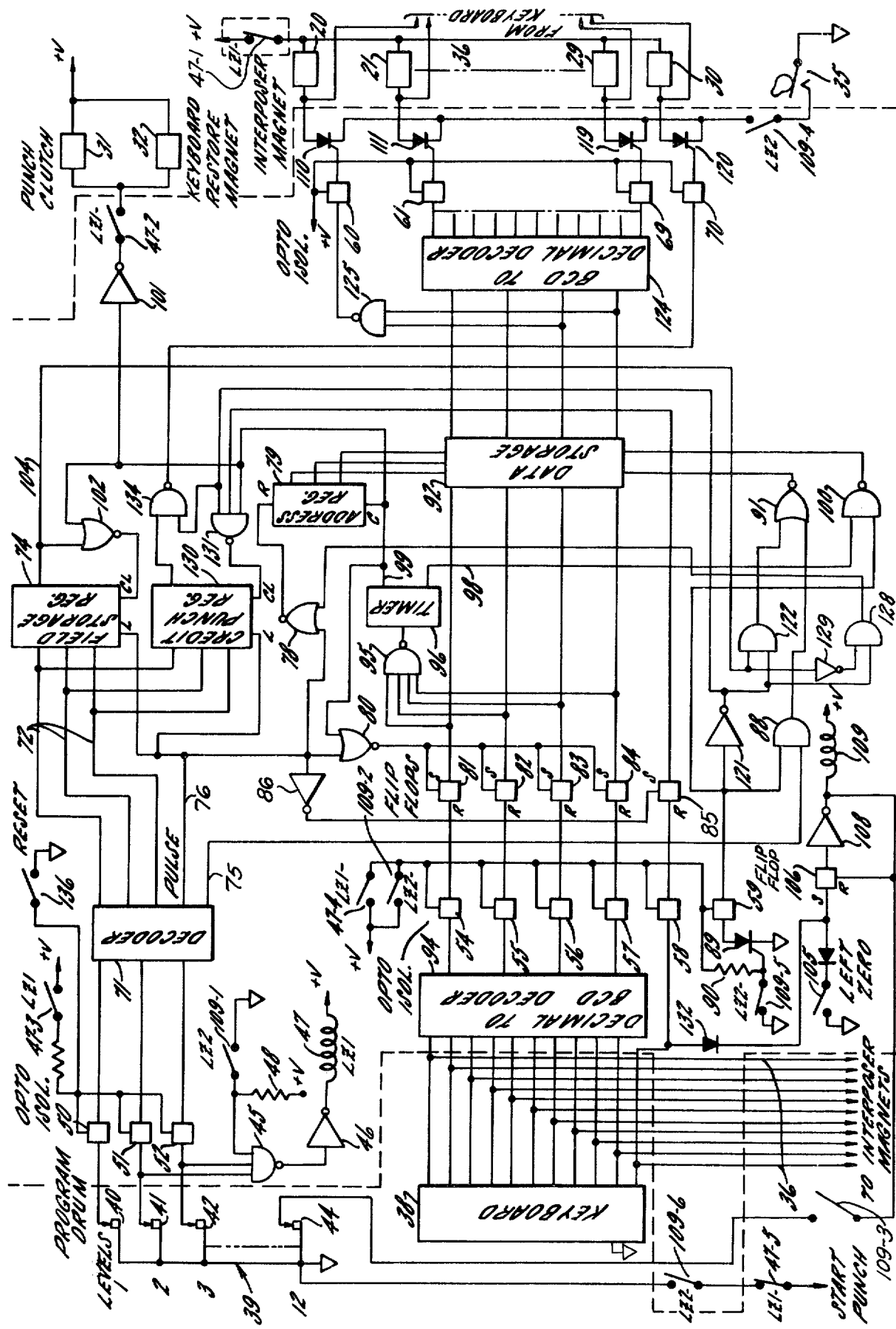

LEFT ZERO FILL CIRCUIT

This invention relates to keypunch machines for punching data storage cards, and more specifically to a left zero fill circuit for use with such machines.

Keypunch units, including those having a left zero fill capability, are known. Such devices are widely utilized, for example, in computerized consumer credit systems wherein accounts for individual consumers may be updated by punching data onto data storage cards in an off line operation, and later entering those cards into the computer memory for updating of the accounts. In such systems each data card, typically having 80 columns with 12 positions in each column for receiving coded punches, is divided into fields for receiving specific information. The fields are all fixed in size, and the keypunch is arranged to respond to a master program card carried on a program dum to index the data card to the start of a subsequent field after the punching of the last entry in a preceding field. In certain fields, such as those dedicated to account number, the size of the field and the size of the data entry always coincide. In other fields, however, such as those dedicated to the amount of debit or credit, the field size is arranged to coincide with the largest permissible entry. As the field entries must be right justified, in the event a data entry must be made wherein the number of characters within the entry is less than the number of columns within the field, the operator of a non-left zero equipped keypunch must physically punch in the leftmost zeros. For example, if it were desired to enter the amount $247.36 within an eight character field, the keypunch operator would be required to depress the following keys in sequence: 0-0-0-2-4-7-3-6. By way of contrast, an operator using a left zero fill equipped machine would be required to depress the following keys in sequence: 2-4-7-3-6-LZ. The left zero fill circuitry would then cause the punching of the full field including the leftmost zeros.

As noted above, the left zero fill concept is not a new one. A recent example of a device capable of performing that function is described in U.S. Pat. No. 3,740,726 to Battistoni et al. entitled Left Zero Circuit for Key Entry Device. An earlier form of keypunch having a left zero fill capability is available from the IBM Corporation and is known as the Model 029 Keypunch. In spite of the availability of such devices, many keypunch units not having the left zero capability are still in use. Certain of these units, for example the IBM Models 024 and 026 are provided with program drums for setting individual fields, but lack the circuitry necessary to perfrom a left zero operation within those fields. In many cases, it would be desirable to retrofit such machines with a package capable of providing a left zero operation, if the retrofit could be accomplished at a cost which is economically justifiable.

With the foregoing in mind, it will be easily appreciated that the aforementioned left zero fill devices have serious shortcomings when considered as a retrofit package for existing keypunch machines. The Battistoni device contemplates a fully buffered keypunch having separate input and output memories and adapted to accept data for one card while punching the previously keyed card. As the keypunch machines exemplified by the Models 024 and 026 are unbuffered machines, it is seen that the application of Battistoni's circuit to those devices would, in effect, change their very nature.

While it is physically possible to retrofit the existing machines with the Model 029 left zero fill circuit, in many cases it is difficult to economically justify such a step. More specifically, the left zero fill circuit provided by the Model 029 keypunch utilizes relay logic including a series of reed relay shift registers for storing data and other relays for performing the necessary logical operations. While the Model 029 system is designed to operate with non-buffered keypunches, the limitations imposed by the relay logic such as cost, size, etc. have limited the acceptance of that left zero fill circuit in some applications. Additionally, many of the earlier machines include transformerless power supplies which may introduce compatibility problems.

With the foregoing in mind, it is a general object of the present invention to provide a left zero fill circuit having a different internal structure and operating mode than those known heretofore, and which may be economically retrofitted to a non-left zero fill keypunch.

A related object of the invention is to provide a solid state left zero fill circuit for use with a keypunch machine which is economical, reliable and compact. In conjunction with the foregoing object, it is a further object to provide such a package which is miniaturized and may be configured to fit within existing keypunch machines.

According to another aspect of the invention, it is an object to provide a left zero fill circuit of the foregoing type which is electrically isolated from the keypunch components to eliminate the effects of power supply incompatibility and to allow normal servicing of the keypunch unit.

A detailed object of the invention is to provide a left zero fill circuit for use with a keypunch machine utilizing registers in the overall control system but providing a semiconductor memory as the storage element.

Other objects and advantages will become apparent from the following detailed description when taken in conjunction with the sole drawing which is a diagram, partially in schematic and partially in block form, illustrating a left zero fill circuit exemplifying the present invention.

While the invention will be described in connection with a preferred embodiment, it will be understood that there is no intention to limit it to that embodiment. On the contrary, the intent is to cover all alternatives, modifications and equivalents as may be included within the spirit and scope of the invention as defined by the appended claims.

Turning now to the drawing, there is illustrated a left zero fill circuit exemplifying the present invention, in conjunction with certain elements of a keypunch machine necessary for a complete understanding of the operation of the circuit. It will be understood that the keypunch machine, which may for example take the form of the aforementioned Models 024 and 026, includes numerous components not illustrated on the drawing, but which are well known to those skilled in the art.

Among the illustrated keypunch components are the interposer magnets 20-30 for controlling the 0-9 and 11 punches. The interposer magnets operate in conjunction with the punch clutch 31 which cycles the punching mechanism to perforate a data card. Also illustrated is a keyboard restore magnet 32 which is cycled after a keystroke to reset the keyboard in preparation for receiving a subsequent keystroke. Wires are also provided to the punch clutch and keyboard restore magnets to non-illustrated components of the keypunch machine for controlling those functions during normal operation. A cam switch 35, a further illustrated element of the keypunch machine normally used for the duplicate function, is modified to control the timing of a left zero output cycle as will be described below.

As indicated by the group of eleven connections 36, the interposer magnets 20-30 are coupled directly to associated keys on the keyboard 38. As the data entered into left zero fields is numeric in nature, the keyboard 38 may be considered to be strictly a numeric keyboard with individual keys coupled directly to the associated interposer magnets. However, it will be apparent that alpha-numeric operation may be provided, except in a left zero field, by suitably encoding alphabetical keystrokes to actuate two or more interposer magnets.

In normal operation, the operator depresses a key on the keyboard causing the ground signal, illustrated at the lower portion of the keyboard, to be applied to the left hand side of the interposer magnet associated with the depressed key. As the right hand sides of the interposer magnets are coupled to a suitable supply of positive voltage, the selected interposer (or interposers) will be actuated. Elements of the keypunch machine (not illustrated) cause a punch cycle to take place, such cycle including operation of the punch clutch to cycle the punch mechanism, and operation of the keyboard restore magnet to prepare the keyboard to receive a subsequent keystroke.

A final standard keypunch element illustrated in the drawing is the program drum generally indicated at 39. While the program drum, just as the data card, normally includes 12 levels, only levels 1, 2, 3 and 12 are illustrated. During normal operation a pre-punched master program card is inserted on the program drum, the combination acting through elements not shown to cause the keypunch machine to index to the preselected fields set up on the master program card for allowing the entry of data into those fields.

The remaining illustrated components comprise a left zero fill circuit constructed in accordance with the invention for use with the above described keypunch machine. In carrying out the invention, such circuit is responsive to the perforations on the master program card for initiating a first or input phase of the left zero operation, during which normal operation of the keypunch is inhibited while the data representing integers resulting from actuations of the keyboard is stored in a data memory. A second or output phase of the left zero fill operation is then initiated to cause the left zeros and the stored data to be punched onto the data card. It should be noted at this point that the illustrated left zero fill circuit contemplates a maximum field size of eight characters, compatible with most existing systems. However, it will be appreciated that the capacity of the circuit may easily be expanded, for example, to sixteen characters by utilizing the full capabilities of the registers and memories.

For initiating the input phase of a left zero operation, in keeping with the invention means are provided for monitoring the program drum, shown herein as a NAND gate 45, an inverter 46 and a relay 47. It is seen that two of the three inputs of NAND gate 45 are coupled to contacts 41 and 42, the second and third levels of the program drum. The third input of NAND gate 45 is normally enabled by a suitable supply of positive voltage coupled through a resistor 48. As the 2 and 3 levels on the master program card are perforated only in the first column of a left zero selected field, it is seen that NAND gate 45 will normally be satisfied, and will be caused to drive its output to a high level only in response to the entry into a left zero field. Accordingly, relay 47 is normally deactivated but is energized upon indexing of the program drum to the start of a left zero field.

The energization of the relay 47, which initiates the input phase of a left zero operation, affects several circuits. Contacts 47-1 are opened to remove the supply of energizing voltage from the interposer magnets, thereby to prevent the interposer magnets from responding to the actuation of the keyboard. Contacts 47-2 are closed without immediate effect to prepare a circuit to cycle the punch clutch and keyboard restore magnet. Contacts 47-3 are closed to provide an enabling signal to a group of opto-isolators 50-52. The enabling signal may take the form of a suitable supply of positive voltage coupled to the LED within the opto-isolator for allowing the LED to be illuminated in response to the application of a low-going input signal. That operation will cause the production of an output signal by means of the light coupled from the LED to a light responsive device such as a phototransistor within the opto-isolator package.

Contacts 47-4 are also closed in response to actuation of relay 47 providing a similar enabling signal to opto-isolators 54-59 and 60-70. Finally, contacts 47-5 are opened to prevent the initiation of a punching cycle during keyboard entries performed in the input phase.

For determining the size of the left zero field from the master program card, and for coupling a digital number indicating the field size to the remaining circuitry, a decoder 71 is provided having its three inputs coupled to the opto-isolators 50-52. The program card is encoded in levels 1, 2 and 3 with perforations to indicate the size of the left zero field. The resulting open or closed conditions of switches 40, 41 and 42 provide input signals to the opto-isolators 50,51 and 52 which cause corresponding signals to be coupled to the decoder 71. The lines 72 coupling the decoder 71 to the field storage register 74 carry a binary number responsive to the program drum for indicating the size of the left zero field. Additionally, the decoder 71 provides a signal on line 75 which is maintained at a high level during the input phase of a left zero operation. Finally, the decoder 71 emits a pulse on line 76 indicating that the program drum has just detected the start of a left zero field.

The pulse produced on line 76 is coupled to the load input of the field storage register 74 for causing the field size data present on lines 72 to be parallel loaded into the register. The pulse produced by decoder 71 also serves a resetting function, acting through NOR gate 78 to reset address register 79, through NOR gate 80 to set flip-flops 81-84, and through inverter 86 to set flip-flop 85. As will be described below, the flip-flops 81-85 are adapted to be shifted to their reset state in response to various input signals.

As a final result of the detection of the start of a left zero field, the level change produced by the decoder 71 on line 75 is coupled to the input of AND gate 88 to enable that gate. It is seen that the second input of AND gate 88 is coupled to the output of opto-isolator 59 whose input is coupled to the anode of an SCR 89. The SCR has its cathode coupled directly to circuit common and its gate coupled to circuit common through a normally closed relay contact. Accordingly, no signal is applied to the input of the opto-isolator causing its output to be high thereby enabling AND gate 88. The output of AND gate 88 is coupled to the input of NOR gate 91. The resuling low signal at the output of NOR gate 91, which is coupled to the enable input of a data memory 92, prepares the memory for operation by enabling it.

The data memory 92, which forms an important feature of the invention, may be implemented by a commercially available RAM (random access read/write memory). Accordingly data representing integers may be efficiently stored in selected locations, and retrieved when desired without the need for shifting of multibit storage registers.

Having been conditioned for operation, the left zero fill circuit is prepared to receive data representing integers in response to manual actuations of the keyboard. Accordingly, an operator may sequentially depress the numerical keys corresponding to the data to be entered in the left zero field. It is seen that the ten numeric keys of the keyboard are coupled to a decimal to BCD encoder 94. It is preferred that the decimal to BCD encoder be non-standard to the extend that it encodes the decimal 0 as a 12 (1100). Accordingly, the depression of any of the numerical keys on keyboard 38 will be encoded by encoder 94 and cause the coupling of a signal through one or more of the opto-isolators 54-57 to reset one or more of the flip-flops 81-84. A NAND gate 95 having inputs coupled to the outputs of the flip-flops 81-84 is provided for detecting a data entry. Accordingly, in the normal set state of the flip-flops, the output of the NAND gate 95 is normally at a low level. However, in response to the depression of one of the keys on the keyboard 38, at least one of the flip-flops 81-84 will be reset. As a result, the output of NAND gate 95 will be driven to a high level thereby triggering a timer 96.

The timer 96, which may comprise an arrangement of monostable multivibrators, is arranged to provide a first pulse on output line 98 followed by a delayed pulse on output line 99. The pulse on line 98 is coupled to the input of a NAND gate 100. As the second input of NAND gate 100 is coupled to the output of opto-isolator 59, which it is recalled is maintained at a high level during the input phase, it is seen that the output of NAND gate 100 is driven to a low level for the duration of the initial pulse. This pulse, which is coupled to the write-in input of the data memory 92 causes the memory to store the data represented by the states of flip-flops 81-84 in the memory location determined by the address register 79. It is seen that the outputs of the address register 79 are coupled to the address inputs of the data memory 92 for addressing respective locations within the data memory 92.

At the termination of the pulse on line 98, the write-in line to the data memory is disabled and the second pulse appears on line 99. The delayed pulse on line 99 is coupled through NOR gate 80 to reset flip-flops 81-84 thereby preparing the input circuitry to receive a subsequent keystroke. Additionally, the pulse is coupled through inverter 101 and the closed relay contacts 47-2 to cycle the keyboard restore magnet and the punch clutch. The keyboard restore magnet 32 thereby prepares the keyboard for a subsequent operation. The punch clutch 31 is cycled without effect as the interposer magnets are disabled, the purpose being to make the input cycle "feel" normal to the operator. The leading edge of the delayed pulse on line 99 is coupled through a NOR gate 102 for clocking the field storage register 74. The field storage register 74 is preferably arranged as a down counter adapted to produce a positive output on line 104 after receiving a number of clock pulses equal to the number initially loaded into the register. Finally, the delayed pulse on line 99 is coupled to the clock input of address register 79, and is adapted to increment the address register on the trailing edge of the timer pulse, thereby to address the next sequential location in data memory 92 in preparation for storing a subsequent data entry.

Having thus described the response of the left zero fill circuit to a single keystroke, it will be apparent that sequential keystrokes cause the storage in the data memory 92 of data corresponding to those keystrokes, while the field storage register is continually decremented to indicate the number of unfilled field positions. After all integers in the field have been entered by manual actuation of the keyboard, the field storage register 74 determines the number of left zeros remaining in the left zero selected field.

For initiating the output phase of a left zero operation, a left zero pushbutton 105 is coupled between circuit common and the set input of a flip-flop or latch 106. Thus, in response to the momentary depression of the left zero button 105 the latch 106 is set causing its output, acting through inverter 108, to energize a realy 109. Relay 109 is a multicontact relay adapted to condition the left zero fill circuit for operation in the second or output phase.

The operation of relay contacts 109-1 serves to disable NAND gate 45 thereby deenergizing the relay 47. Accordingly, all the contacts 47 are returned to their illustrated positions with the following results: the opto-isolators 50–52 are disabled by opening contacts 47-3 to remove the input signals from the field storage register, an enabling voltage is applied to the interposer magnets through contacts 47-1, the lefft zero fill circuit is prevented from directly affecting the keyboard restore magnet and punch clutch by the opening of contacts 47-2, and the start punch circuit is partially completed through the closing of contacts 47-5.

In response to the energization of relay 109, contacts 109-2 are closed to maintain the enabling voltage on opto-isolators 54-59 and 60-70. Relays contacts 109-3 are closed to reset the latch 106 while maintaining the energization of relay 109 by way of the ground signal provided through level 12 of the program drum. It should be noted at this time that the master program card is encoded to include a 12 punch in each column of the left zero field, thereby maintaining relay 109 in an energized condition for the entire left zero output phase. Relay contacts 109-4 are closed to couple the commoned cathodes of SCR's 110-120 to the cam switch 35, which is an element of the keypunch unit. Accordingly, SCR's 110–120 are prepared to be energized in response to signals from the opto-isolators 60–70 during the time the cam switch 35 is closed by the keypunch machine.

Contacts 109-5 are opened in response to the energization of relay 109 thereby allowing current flow through resistor 90 to the gate of SCR 89. SCR 89 thus latches into the on condition causing a low signal on the output of opto-isolator 59. This low signal disables AND gate 88 thereby preventing the enabling of the data memory through the path described above. However the low signal is also applied to the input of an inverter 121 causing the output thereof to go high thereby providing a preliminary enabling signal to AND gate 122. It is seen that the second input of AND gate 122 is coupled to the output 104 of field storage register 74. Thus, under the condition when the field storage register is not producing a register empty signal, AND gate 122 is prevented from being satisfied thereby maintaining the data memory 92 in a disabled condition. Accordingly, all the output lines of the data memory 92 are maintained at a high level. Finally, the low signal produced by opto-isolator 59 is coupled to the input of NAND gate 100 to prevent the writing of any further data into the data memory 92.

A final result of the energization of relay 109 is to switch contacts 109-6 from their illustrated position to their alternate position thereby disabling the keypunch internal start punch cycle but providing the ground signal from the program drum to the start punch mechanism within the keypunch. Accordingly, the keypunch is caused to initiate a punching cycle. It will be appreciated that punching cycles are caused to occur in sequence as long as contacts 109-6 remain in their alternate position.

For controlling the interposer magnets during the thus initiated punching cycles, the data memory 92 has its outputs coupled to the inputs of a BCD to decimal decoder 124. In the event a number of characters entered during the input phase is less than the field size, the field storage register 74 will maintain a low level on output line 104, disabling the data memory as noted above. Accordingly, all the inputs to the BCD to decimal decoder 124 will be high thus causing all the outputs thereof to be high, preventing the energization of any of the opto-isolators 61-69. However, the high signals on the 8 and 4 lines of data memory 92 are detected by a NAND gate 125 and coupled to the input of opto-isolator 60 thereby supplying a gate signal to SCR 110. Accordingly, SCR 110 is adapted to conduct when the ground signal is supplied by cam switch 35 during the punching cycle, causing the energization of the 0 interposer magnet 20, with the result that a zero is punched in the particular column of the card then under the punches.

During each punch cycle the signals applied to the interposer magnets are coupled back to the decimal to BCD encoder by interconnection 36 to cause the resetting of one or more of the flip-flops 81–84. Accordingly, the timer 96 is activated during each punch cycle to cause a clocking operation as described in conjunction with the input phase. Thus, the field storage register 74 is clocked in response to each punch cycle, and ultimately is caused to produce a register empty signal after a total number of cycles, (both input and output) equal to the decoded size of the left zero field.

After the field storage register 74 detects that the proper number of left zeros has been punched, it produces a register empty signal on line 104 which is coupled to the input of AND gate 122. As a result, AND gate 122 is satisfied causing the output of NOR gate 91 to be driven to a low level thereby enabling data memory 92.

An AND gate 128 having one of its inputs driven by inverter 121, and its second input driven by the output of field storage register 74 inverted by inverter 129, is provided to operate in conjunction with AND gate 122. Accordingly, during the first portion of the output phase, when the left zeros are being punched, the output of AND gate 122 will be at a low level thereby preventing the enabling of the data memory while the output of AND gate 128 will be at a high level holding the address register 79 in its reset condition. When the field storage register 74 produces a register empty signal on line 104, the output of AND gate 122 will be driven high as described above thereby enabling the data memory 92, and the output of AND gate 128 will be driven low thereby removing the reset signal from the address register 79.

In summary, after the proper number of left zeros have been punched, the address register and data memory are prepared for operation so that subsequent clock cycles will increment the address register to sequentially address the locations in data memory 92 where the keypunched data had been stored. As a result, the stored data will be sequentially read out on the output lines of data memory 92 and decoded by BCD to decimal decoder 124. The outputs of the decoder are coupled through the opto-isolators 61–69 to provide gate signals to selected ones of the SCR's 111–119, allowing them to conduct when cam switch 135 couples a ground signal to the common cathodes. As a result, the interposer magnets will be energized in accordance with the data stored in the memory causing the punching onto the data storage card of the keypunched stored information.

Upon the completion of punching of the last column of the left zero field, the absence of a 12 punch on the master program card will cause the contacts 44 on the program drum to open thereby deenergizing relay 109. In response thereto all of the contacts 109 will return to their illustrated positions, terminating the left zero fill operation and returning control to the program drum for filling of subsequent fields. Subsequent fields may be filled in either a normal mode or the left zero mode depending upon the program recorded on the master program card.

In keypunching operations of the type considered herein, it is oftentimes required to differentiate between a debit and credit transaction by activating the 11 punch when punching the last column of the left zero field to indicate the amount entered is a credit. To reduce the number of required keystrokes, it is also common to initiate a left zero output cycle by depression of the key on the keyboard corresponding to the 11 punch.

In practicing the invention, register means are provided for controlling the operation of the 11 punch as a credit indicator in a left zero field. Accordingly, a credit punch register 130 is provided having its data input and its load input coupled in parallel with similar inputs of the field storage register. As a result, the digital number indicating the field size is loaded into both the field storage register and the credit punch register at the initiation of a left zero operation. However, the credit punch register is clocked differently than the field storage register, such clocking being controlled by a NAND gate 131.

For receiving a signal corresponding to the manual actuation of the credit key, the opto-isolator 58 is coupled to the credit button and is adapted to reset flip-flop 85 in the event the credit button is depressed. It is noted that a diode 132 is coupled between the credit button and the set input of flip-flop 106. Accordingly, the manual actuation of the key corresponding to the credit punch is adapted to initiate the output phase of a left zero operation.

Flip-flop 85 is not reset with the four data flip-flops 81-84, but is adapted to be set at the initiation of a left zero operation in order to clear the system. Accordingly, once the flip-flop 85 is reset in response to actuation of the credit key to store a credit signal, it remains in that condition until a subsequent left zero cycle is initiated. The high signal provided at the output of flip-flop 85 representing a stored credit signal is applied to one of the inputs of NAND gate 131 providing a partial enabling signal. A second partial enabling signal is provided by the output of inverter 121 thereby allowing NAND gate 131 to operate only under the conditions where (a) the credit flip-flop has been reset and (b) the system is in the output phase. A third input to NAND gate 131 is provided by the timer 96. Accordingly, the credit punch register is clocked for each output cycle when that output cycle has been initiated by the depression of the credit key. It is, therefore, apparent that the credit punch register will emit a positive register empty signal during the punching of the last column in the left zero field. That signal is coupled to the input of NAND gate 134 which has its second input driven by the output of inverter 121. As a result, the output of NAND gate 134 will be driven to a low level under the stated conditions to energize opto-isolator 70 thereby to provide a gating signal to SCR 120. Accordingly, during the punching of the last column of the left zero field, as controlled by cam switch 35, credit punch interposer magnet 30 will be energized in addition to the selected one of the interposer magnets 21-29.

In order to "erase" erroneous entries, a reset key is provided which is coupled between ground and the enabling input to opto-isolators 50-52. Accordingly, during a left zero fill operation, momentary depression of the reset key 136 disables each of the opto-isolators 50-52 thereby providing a high signal to each of the three inputs of decoder 71. When the reset button 136 is released the decoder 71 is again provided with the coded signal from the program drum thereby causing the reloading of the field storage register, credit punch register etc. as well as the various resetting functions described above.

The isolating means described above, which are an important feature of the invention, provide several advantages for a left zero fill circuit intended to be retrofitted to existing keypunch units. A first advantage is the elimination of the effects of power supply incompatibility. More specifically, the electonics within the left zero fill circuit operate from a relatively low voltage d.c. supply, whereas the keypunch units utilize the rectified line voltage. Additionally, certain of the early keypunch units utilize transformerless power supplies introducing grounding problems which might prove destructive to the solid state components. As illustrated in the drawing, the electronic components such as the registers and the memory are fully isolated via opto-isolators, thereby achieving the necessary power supply level translation. It is noted that certain of the components illustrated in block diagram form such as the encoder 94 and the NAND gate 45, are coupled directly to keypunch elements, but may be designed using relatively inexpensive discrete components of sufficient voltage rating.

A second advantage achieved by the isolating means is the ability to service the basic keypunch unit in the normal manner simply by deenergizing the left zero fill power supply. In that condition, all relay contacts are left in their deenergized condition (which it is recalled allows normal keypunch operation) and all opto-isolators are prevented from affecting any of the signal lines.

In summary, it is seen that what has been provided is a left zero fill circuit utilizing solid state logic including registers for control of the left zero operation, and having a data memory for directly storing entered data in respective memory locations, without the need for shifting of data through multibit registers. The solid state circuit is accordingly miniaturized and may be configured to mount in an available space on the keypunch machine. Additionally, the various interconnections to the keypunch machine itself are made through isolating means so that the left zero fill circuit is in effect "invisible" to the keypunch machine when the left zero fill circuit is deenergized. Accordingly, in the event servicing of the basic keypunch unit is required, the left zero fill circuit can be deenergized, allowing the machine to be serviced utilizing the normal procedures.

We claim as our invention

1. A left zero fill circuit for use with a card keypunch machine for providing a left zero fill capability thereto, said circuit comprising, in combination:
    a data memory for storage of integers entered by manual keystrokes,
    a field storage register for storing a number indicating the size of the left zero field and successively decrementing said number in response to the same manual keystrokes thereby to determine the number of left zeros remaining in the left zero selected field after said integers are entered,
    and means for readout of said data memory under the control of said field storage register to operate the punches of the keypunch machine to punch the left zeros and integers on a card in said machine.

2. For use with a keypunch unit for punching data storage cards having a plurality of data fields, said keypunch unit comprising a keyboard, a program drum for receiving a pre-punched master program card and punches normally operated in response to manual actuation of the keyboard to perforate a data storage card within a selected field under the direction of the program recorded on said master program card; a left zero fill circuit for automatically entering the left zeros to fill a left zero selected field and comprising in combination, means responsive to the program drum for inhibiting normal operation of the punches during an input phase of a left zero operation for the left zero selected field, means including a data memory responsive to manual keyboard actuations for storing data representing integers for the left zero selected field, a field storage register for determining the number of left zeros remaining in the left zero selected field after all integers in the field have been entered by manual actuation of the keyboard, and circuit means responsive to manual actuation of a left zero button for operating the punches to perforate a data storage card and enter the left zeros determined by the field storage register and the integers stored in the data memory in the left zero selected field.

3. For use with a keypunch unit for punching data storage cards having a plurality of data fields, said keypunch unit comprising a keyboard, a program drum for receiving a pre-punched master program card, punches, and a punching mechanism including interposer magnets normally operated in response to manual actuation of the keyboard to operate the punches to perforate a data storage card within a selected field under the direction of the program recorded on said master program card; a left zero fill circuit for automatically entering the left zeros to fill a left zero selected field and comprising in combination, means operated by the program drum for inhibiting normal operation of the punching mechanism during an input phase of a left zero operation for the left zero selected field, storing means includng data memory responsive to manual keyboard actuations for storing data representing integers for the left zero selected field in respective memory locations, a field storage register for determining the number of left zeros remaining in the left zero selected field after all integers in the field have been entered by manual actuation of the keyboard, and circuit means responsive to manual actuation of a left zero button for actuating the punching mechanism and initiating a left zero output phase, said circuit means including means coupling the field storage register, the storing means and the interposer magnets for operating the punch mechanism to perforate a data storage card and enter the left zeros determined by the field storage register and the integers stored in the data memory in the left zero selected field.

4. The left zero fill circuit as set forth in claim 3 wherein the connections between the components of the keypunch unit and the elements of the left zero fill circuit include isolating means interposed therein to electrically isolate said elements from said unit while conducting signals therebetween.

5. The left zero fill circuit as set forth in claim 3 wherein the storing means includes an address register for selectively addressing the locations in the data memory.

6. The left zero fill circuit as set forth in claim 3 wherein the keyboard includes a credit key for operating an associated credit punch, the left zero circuit further including means for coupling the credit key to the circuit means for actuating the punching mechanism and initiating a left zero output phase, and a credit punch register for actuating the credit punch in conjunction with the perforation of the final integer stored in the data memory.

7. For use with a keypunch unit for punching data storage cards having a plurality of data fields, said keypunch unit comprising a keyboard, a program drum for receiving a pre-punched master program card, punches, and a punch mechanism including interposer magnets, said master program card including perforations indicating the beginning and end of a left zero fill field and the size of said left zero fill field; a left zero fill circuit for automatically entering the left zeros to fill a left zero selected field and comprising in combination, means responsive to the program drum for disabling the interposer magnets and for initiating an input phase of a left zero fill operation, means including a left zero key for terminating said input phase and initiating an output phase of the left zero fill operation, a field storage register, means coupling the field storage register to the program drum for entering the left zero field size into said register, a data memory having a plurality of storage locations, an address register coupled to the data memory for selectively addressing the storage locations, means coupling the inputs of the data memory to the keyboard for storing data resulting from manual keystrokes during said input phase, means coupling the outputs of the data memory to the interposer magnets for controlling said magnets in punch cycles performed during said output phase, means for clocking the field storage register in response to (a) manual keystrokes during said input phase and (b) punch cycles during said output phase whereby the field storage register produces a register empty signal after being clocked a number times corresponding to the size of the left zero fill field, means for clocking the address register in response to (a) manual keystrokes during said input phase thereby to store the data resulting from said keystrokes in respective locations in the data memory and (b) punch cycles during said output phase thereby to cause the punching of data stored within respective locations in the data memory onto the data storage card, means for disabling said data memory and said address register to prevent said punching of the stored data during said output phase in the absence of a field storage register empty signal, whereby the punch cycles performed before the production of a field storage register empty signal cause the punching of the left zeros and the punch cycles performed after the production of a field storage register empty signal cause the punching of the data stored within the data memory, means responsive to the program drum for terminating the left zero fill operation, and isolating means interposed between the components of the keypunch unit and the elements of the left zero fill circuit for providing electrical isolation between said elements and said unit while conducting signals therebetween.

8. The left zero fill circuit as set forth in claim 7 further including a credit punch register having inputs paralleled with the field storage register so that the size of the left zero fill field is entered into the credit punch register, means responsive to the manual actuation of a credit button on the keyboard for storing a credit signal and for initiating an output phase of the left zero fill operation, means for clocking the credit punch register in response to punch cycles during said output phase in the presence of a stored credit signal whereby the credit punch register produces a credit punch register empty signal during the punching cycle performed on the final integer of the left zero fill field, and means responsive to the credit punch register empty signal for actuating a predetermined one of the punches indicating a credit.

9. For use with a keypunch unit for punching data storage cards having a plurality of columns divided into respective data fields, said keypunch unit comprising a keyboard, a program drum for receiving a pre-punched master program card, punches, and a punching mechanism including interposer magnets normally operated in response to manual actuation of the keyboard to operate the punches to perforate a data storage card within a selected field under the direction of the program recorded on said master program card; a left zero fill circuit for automatically entering the left zeros to fill a left zero selected field and comprising in combination, means operated by the program drum for inhibiting normal operation of the punch mechanism during an input phase of a left zero operation for the left zero selected field, a field storage register, means coupling the program drum to the field storage register for entering the selected size of the left zero field into said register, means for clocking the field storage register in response to each keystroke so that said field storage register indicates the number of unfilled positions in the left zero field, a data memory, an address register coupled to the data memory for addressing individual locations within said memory, means coupling the keyboard to the data memory for storing data for a left zero selected field in response to manual keystrokes, means for clocking the address register in response to manual keystrokes so that said data is stored in respective locations in said data memory, means responsive to manual actuation of a left zero button for initiating a series of punch cycles of said keypunch unit, means coupling the data memory to the interposer magnets for controlling the punches, circuit means coupling the field storage register, the address register and the data memory for disabling the address register and the data memory to cause the punching of the left zeros and for subsequently enabling the address register and the data memory to cause the punching of the data stored in the data memory onto the data storage card during successive punch cycles, means responsive to the program drum for terminating the left zero operation, and electrical isolating means for coupling signals between the left zero fill circuit and the keypunch unit while providing electrical isolation therebetween.

10. The left zero fill circuit as set forth in claim 9 further including a credit punch register, said means coupling the program drum to the field storage register serving to enter the size of the left zero field into the credit punch register, storage means responsive to the manual actuation of a credit key on said keyboard for storing a credit signal, means responsive to the stored credit signal and the credit punch register for causing the actuation of a credit punch in conjunction with punching of the last integer in the left zero field.

11. The left zero fill circuit as set forth in claim 10 further including a reset key and means responsive to the manual actuation of said reset key for resetting the field storage register, the credit punch register, and the address register thereby to delete an erroneous entry.

12. The left zero fill circuit as set forth in claim 9 wherein the means coupling the keyboard to the data memory includes an encoder, and the means coupling the data memory to the interposer magnets includes a complementary decoder, whereby the keyboard data is efficiently stored in coded format.

13. The left zero fill circuit as set forth in claim 9 wherein the means coupling the keyboard to the data memory includes bistable means for buffering the keyboard data.

14. The left zero fill circuit as set forth in claim 9 further including means for coupling the credit key to the means for initiating a series of punching cycles, whereby depression of said credit key serves to initiate a left zero fill punching operation.

15. The left zero fill circuit as set forth in claim 9 further including a reset key and means responsive to manual actuation of said reset key for resetting the field storage register and the address register thereby to delete an erroneous entry.

16. The left zero fill circuit as set forth in claim 9 wherein the electrical isolating means includes a plurality of opto-isolators.

* * * * *